(12) United States Patent
Ramachandran et al.

(10) Patent No.: US 10,110,702 B2
(45) Date of Patent: Oct. 23, 2018

(54) DYNAMIC DOWNLOAD AND ENFORCEMENT OF NETWORK ACCESS ROLE BASED ON NETWORK LOGIN CONTEXT

(71) Applicant: Aruba Networks, Inc., Sunnyvale, CA (US)

(72) Inventors: Venkatesh Ramachandran, Banglore (IN); Rajalakshmi Manoharan, Bangalore (IN); Mahesh Kumar Rathinasamy, Coimbatore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 526 days.

(21) Appl. No.: 14/688,904

(22) Filed: Apr. 16, 2015

(65) Prior Publication Data
US 2016/0309001 A1    Oct. 20, 2016

(51) Int. Cl.
| | |
|---|---|
| *G06F 15/177* | (2006.01) |
| *H04L 29/08* | (2006.01) |
| *H04L 12/24* | (2006.01) |
| *H04L 29/06* | (2006.01) |

(52) U.S. Cl.
CPC .......... *H04L 67/34* (2013.01); *H04L 41/0806* (2013.01); *H04L 67/30* (2013.01); *H04L 67/42* (2013.01)

(58) Field of Classification Search
CPC ............................ H04L 67/34; H04L 41/0806
USPC ......................................... 709/220, 223, 224
See application file for complete search history.

(56) References Cited

U.S. PATENT DOCUMENTS

| | | | | |
|---|---|---|---|---|
| 7,042,988 | B2 * | 5/2006 | Juitt ......................... | H04L 1/22 370/329 |
| 8,146,074 | B2 * | 3/2012 | Ito ............................ | G06F 8/65 717/170 |
| 2006/0185001 | A1 * | 8/2006 | Stieglitz .............. | H04L 41/0806 726/4 |
| 2009/0300711 | A1 * | 12/2009 | Tokutani ............... | G06F 21/554 726/1 |
| 2010/0161703 | A1 * | 6/2010 | Huang et al. .......... | H04L 29/00 709/201 |
| 2012/0079113 | A1 * | 3/2012 | Zhu ..................... | H04L 63/0272 709/225 |

(Continued)

*Primary Examiner* — David R Lazaro
*Assistant Examiner* — Mariegeorges A Henry
(74) *Attorney, Agent, or Firm* — Hewlett Packard Enterprise Patent Department

(57) ABSTRACT

Systems and methods are described that configure network devices to dynamically (1) download privilege setting definitions from an authentication server to address a currently connected set of client devices associated with these privilege setting definitions and (2) clear privilege setting definitions that are no longer in use by client devices connected to the network device. In particular, a network device may determine if a privilege setting definition associated with a successfully authenticated client device is locally available on the network device and request the privilege setting definition from the authentication server when not locally available. In some situations, the authentication server may selectively transmit update messages to network devices that may be affected by an update to a privilege setting definition such that the network devices may request this updated privilege setting definition for download.

12 Claims, 8 Drawing Sheets

(56) References Cited

U.S. PATENT DOCUMENTS

| | | | |
|---|---|---|---|
| 2012/0102166 A1* | 4/2012 | Wackerly | G06F 11/3006 709/222 |
| 2013/0174223 A1* | 7/2013 | Dykeman | G06F 21/10 726/4 |
| 2016/0094386 A1* | 3/2016 | Kaufman | H04L 41/0806 709/220 |

* cited by examiner

DYNAMIC DOWNLOAD AND ENFORCEMENT OF NETWORK ACCESS ROLE BASED ON NETWORK LOGIN CONTEXT

TECHNICAL FIELD

The present disclosure relates to a system and method that configures network devices to dynamically (1) download privilege setting definitions from an authentication server to address a currently connected set of client devices associated with these privilege settings and (2) delete/clear privilege setting definitions that are no longer in use by a client device connected to the network device.

BACKGROUND

Over the last decade, there has been a substantial increase in the use and deployment of network enabled client devices. These client devices may connect to a network device such that the client devices may have access to other devices of a network system. These client devices may be authenticated before gaining greater access to the network system.

For granular control of network access, the network device requires groups of privileges setting definitions (e.g., roles) to be defined. These privilege setting definition are mapped to each authenticated client device and indicate levels and types of access available to each client device in the network system. Privilege setting definitions may include virtual local area network (VLAN) information, voice over Internet Protocol (VoIP) settings, firewall rules, and quality of service (QoS) settings.

The configuration of privilege setting definitions may be done by administrators of the network either directly in the network device or in a central management server. In either case, the process of keeping privilege setting definitions in all network devices up-to-date and synchronized is tedious, inefficient, and may be extremely large in scale. In particular, current systems require each network device in the network system to store each set of privilege settings definitions even when these privilege setting definitions are not in use by the network device (i.e., not assigned to a client device connected to a particular network device). Accordingly, even though certain privilege setting definitions may not be used by a network device, the network system is still required to update these definitions and the network device is still required to devote storage to these definitions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
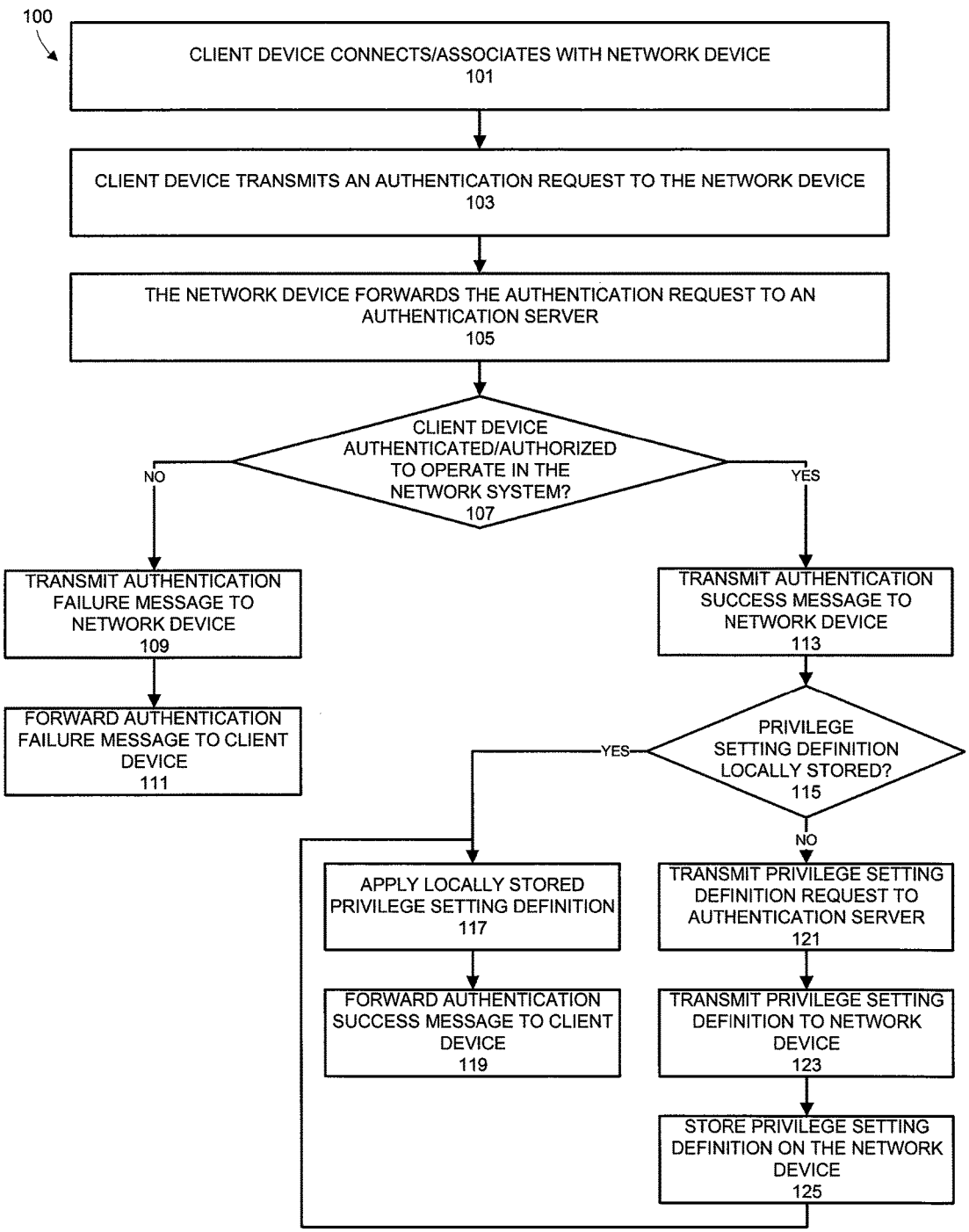
FIG. 1 shows a method for managing privilege setting definitions in a network system according to one embodiment.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Overview

As will be described herein, a system and method is proposed that configures network devices to dynamically (1) download privilege setting definitions from an authentication server to address a currently connected set of client devices associated with these definitions and (2) clear privilege setting definitions that are no longer in use by client devices connected to the network device. For example, upon a client device successfully authenticating in a network system based on communication with an authentication server via a network device, the authentication server may transmit an authentication success message to the network device. The authentication success message may include data identifying a privilege setting definition assigned to the client device, including a version number for the privilege setting definition. For example, the authentication success message may indicate version 2.0 of the privilege setting definition with identifier 001 has been assigned to the newly authenticated client device. Upon receipt of the authentication success message, the network device may query local storage to determine if the version of the privilege setting definition identified in the authentication success message is stored in the network device (e.g., version 2.0 of privilege setting definition 001). If the version of the privilege setting definition identified in the authentication success message is not locally stored on the network device, the network device may request and download the privilege setting definition from the authentication server. In this fashion, the network device retrieves privilege setting definitions based on a need (i.e., based on a client device that has been assigned corresponding privilege setting definitions) instead of storing every privilege setting definition regardless of an association with a currently connected/associated client device.

In some embodiments, upon a client device disconnecting from the network device, the network device may determine whether a privilege setting definition assigned to the now disconnected client device is also assigned to another client device currently connected to the network device. Upon determining that the privilege setting definition is not assigned to any client devices currently connected to the network device, the network device may delete this privilege setting definition from local memory. In this fashion, the network device may free memory utilized by unused data (i.e., unused privilege setting definitions).

In still other embodiments, the authentication server may store or retrieve data that indicates the usage of privilege setting definitions across each network device in the network system. Upon an update to a privilege setting definition on the authentication server, the authentication server may transmit a Change of Authorization (CoA) message to each affected network device (i.e., network devices that have client devices associated with the updated privilege setting definition). On receipt of a CoA message, network devices may request download of the updated privilege setting definition from the authentication server. This updated definition would replace previous versions such that the updated definition is applied to all client devices that are assigned this definition.

As described above, privilege setting definitions may be managed and updated across the network system in an intelligent fashion with minimal impact on resources. These techniques will be described in greater detail below by way of example.

Retrieving/Downloading a Privilege Setting Definition

FIG. 1 shows a method 100 for managing privilege setting definitions in a network system. The method 100 will be described in relation to the network system 200 shown in FIG. 2 and may be exemplified by the sequence diagrams shown in FIG. 3A and FIG. 3B. In one embodiment, the method 100 causes one or more network devices $201_1$-$201_M$ in the network system 200 to dynamically download privilege setting definitions from an authentication server 203 to address a currently connected set of client devices $205_1$-$205_P$ associated with these privilege setting definitions.

Each operation of the method 100 will be described by way of example below. Although shown and described in a particular order, the operations of the method 100 may be performed in a different order. For example, in some embodiments, two or more operations in the method 100 may be performed in at least partially overlapping time periods.

The method 100 will be described in relation to the client device $205_1$ and the network device $201_1$. However, it is understood that the method 100 could be similarly performed for one or more of the client devices $205_2$-$205_P$ and/or the network devices $201_2$-$201_M$.

The method 100 may commence at operation 101 with the client device $205_1$ connecting to a network device $201_1$. In one embodiment, this connection at operation 101 may be a wired or wireless connection. For example, an electrical, optical, or another type of network wire may be connected between network interface ports of the client device $205_1$ and the network device $201_1$ at operation 101. In other instances, the client device $205_1$ may associate with the network device $201_1$ at operation 101 through a wireless channel.

Following connection of the client device $205_1$ to the network device $201_1$, the method 100 may move to operation 103. At operation 103, the client device $205_1$ may transmit a Remote Authentication Dial In User Service (RADIUS) authentication request to the network device $201_1$. The RADIUS authentication request may be communicated over the connection established at operation 101 and may include credentials of the client device $205_1$ and/or a user of the client device $205_1$. The credentials may be comprised of an identifier of the client device $205_1$ (e.g., a media access control (MAC) address), a username, and/or a password. Although described in relation to the RADIUS protocol, in other embodiments other authentication protocols and schemas may be used by the method 100.

At operation 105, the authentication request may be forwarded from the network device $201_1$ to the authentication server 203. The authentication server 203 may thereafter process the request at operation 107. In one embodiment, processing the request by the authentication server 203 at operation 107 may include determining whether the client device $205_1$ is (1) authorized/authenticated to operate within the network system 200 and (2) what level of access is assigned to the client device $205_1$ if the client device is successfully authenticated. In one embodiment, operation 107 may be performed by comparing credentials included in the authentication request with a table of credentials stored in the authentication server 203. For example, the table of credentials may indicate MAC addresses of client device 205 and/or usernames and passwords of users that are authorized to operate in the network system 200 and corresponding privilege setting definitions for these authorized client devices 205 and/or users.

As used herein, privilege setting definitions represent parameter values, permissions, and/or other network settings for client devices 205 in the network system 200. Accordingly, each privilege setting definition includes a set of parameters values, permissions, and/or other settings that may be used for a client device 205 operating within the network system 200. For example, privilege setting definitions may include values for access control lists (ACLs), virtual local area network (VLAN) information, voice over Internet Protocol (VoIP) settings, firewall rules, and quality of service (QoS) settings. In other embodiments, privilege setting definitions may comprise additional pieces of information. In some instances, the privilege setting definitions may identify a role of a client device 205 in the network system 200. The privilege setting definitions may be grouped and represented by an identifier and version number. For example, Table 1 below shows a set of privilege setting definitions that may be assigned or otherwise associated with client devices 205.

TABLE 1

| | | Parameter Values/Permissions/Settings | | |
| --- | --- | --- | --- | --- |
| Identifier | Version | VLAN | QoS | VoIP |
| 001 | 2.0 | 3 | qos-profile q1<br>traffic-class 3<br>drop-precedence low<br>dscp 5<br>dot1p 5 | interface-profile voip-profile v1<br>voip-vlan 3<br>voip-dscp 2<br>voip-dot1p 3 |
| 002 | 1.0 | 2 | qos-profile q2<br>traffic-class 2<br>drop-precedence low<br>dscp 4<br>dot1p 4 | interface-profile voip-profile v2<br>voip-vlan 4<br>voip-dscp 3<br>voip-dot1p 4 |
| 003 | 1.0 | 5 | qos-profile q3<br>traffic-class 1<br>drop-precedence low<br>dscp 2<br>dot1p 2 | interface-profile voip-profile v2<br>voip-vlan 2<br>voip-dscp 1<br>voip-dot1p 1 |

Each parameter value, permission, or setting within a privilege setting definition may be updated by an administrator of the network system 200 such that a new version of a set of privilege setting definition is generated. For instance, the VLAN for the set of privilege setting definition with the identifier 001 may be updated to VLAN 4 and assigned version 2.0 as shown in Table 2 below.

TABLE 2

| Identifier | Version | VLAN | QoS | VoIP |
|---|---|---|---|---|
| | | | Parameter Values/Permissions/Settings | |
| 001 | 2.0 | 4 | qos-profile q1<br>traffic-class 3<br>drop-precedence low<br>dscp 5<br>dot1p 5 | interface-profile voip-profile v1<br>voip-vlan 3<br>voip-dscp 2<br>voip-dot1p 3 |
| 002 | 1.0 | 2 | qos-profile q2<br>traffic-class 2<br>drop-precedence low<br>dscp 4<br>dot1p 4 | interface-profile voip-profile v2<br>voip-vlan 4<br>voip-dscp 3<br>voip-dot1p 4 |
| 003 | 1.0 | 5 | qos-profile q3<br>traffic-class 1<br>drop-precedence low<br>dscp 2<br>dot1p 2 | interface-profile voip-profile v2<br>voip-vlan 2<br>voip-dscp 1<br>voip-dot1p 1 |

Accordingly, privilege setting definitions may be updated and their corresponding version number incremented to reflect this change.

Upon determining that the client device $205_1$ is not authenticated to operate within the network system 200 at operation 107, the method 200 may move to operation 109 to return an authentication failure message to the network device $201_1$, which is eventually forwarded to the client device $205_1$ at operation 111. In some embodiments, while awaiting for authorization/authentication in the network system 200, the network device $201_1$ may assign the client device $205_1$ a default/pre-authenticated privilege setting definition. This default privilege setting definition may be stored on the network device $201_1$ during initialization of the network system 200 or the network device $201_1$ and may not be cleared/deleted from local memory of the network device $201_1$ even when the default privilege setting definition is not currently being used.

Conversely, upon the client device $205_1$ being successfully authenticated at operation 107, the authentication server 203 may transmit an authentication success message to the network device $201_1$ at operation 113. The authentication success message may include various pieces of data. In one embodiment, the authentication success message identifies a privilege setting definition assigned to the client device $205_1$, including a version number for the privilege setting definition. For example, the authentication success message may indicate that version 1.0 of privilege setting definition 001 has been assigned to the client device $205_1$.

At operation 115, the network device $201_1$ may determine whether the privilege setting definition assigned to the client device $205_1$ and identified in the authentication success message is stored locally within the network device $201_1$. This storage may be within the main memory of the network device $201_1$ or any other memory device coupled to or otherwise locally accessible to the network device $201_1$ (i.e., accessible over a local system/memory bus). The determination of the presence of the privilege setting definition at operation 115 includes determining that the correct version of the identified privilege setting definition is locally stored. For instance, if the authentication success message identifies version 2.0 of privilege setting definition 001 and the network device $201_1$ locally stores version 1.0 of privilege setting definition 001, operation 115 would determine that the privilege setting definition for the client device $205_1$ is not locally stored.

Figure 3A:
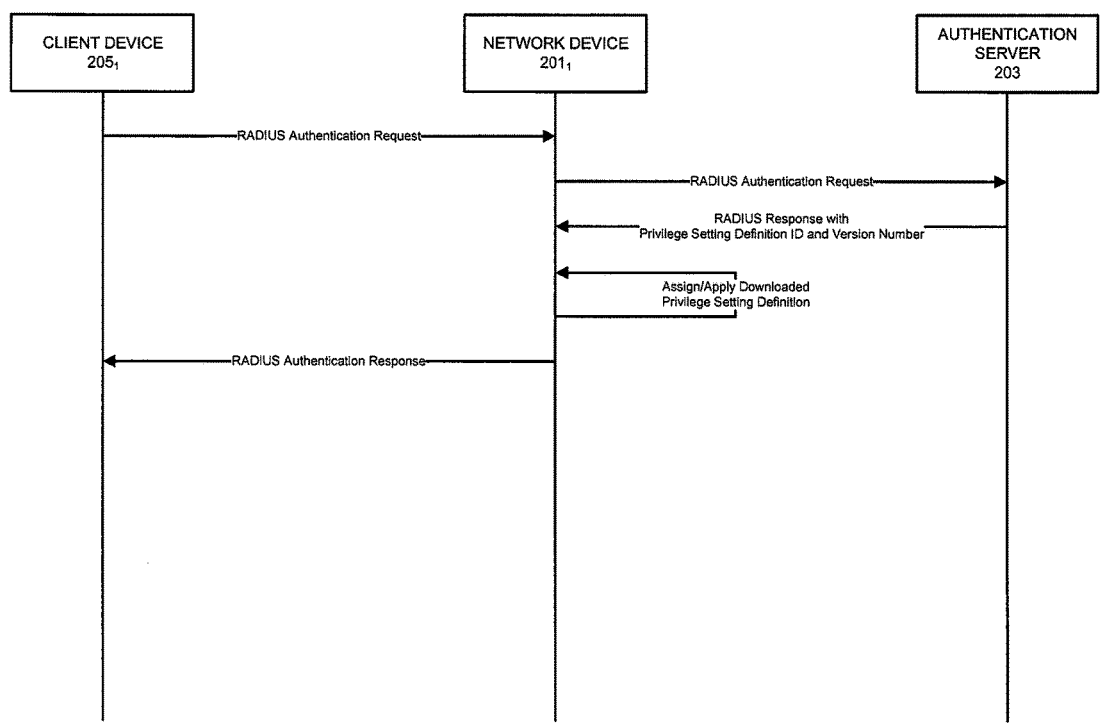
FIG. 3A shows a sequence diagram for applying a privilege setting definition according to one embodiment.

Upon determining that the correct version of the privilege setting definition assigned to the client device $205_1$ is locally stored, operation 117 may apply the parameter values, permissions, and/or settings described in the privilege setting definition to the client device $205_1$ and operation 119 may forward an authentication success message to the client device $205_1$ as shown in FIG. 3A. As noted above, the privilege setting definition includes parameter values, permissions, and/or settings for the client device $205_1$ in the network system 200. After the privilege setting definition has been applied and the authentication success message has been forwarded to the client device $205_1$, the client device $205_1$ may begin operating within the network system 200.

Figure 3B:
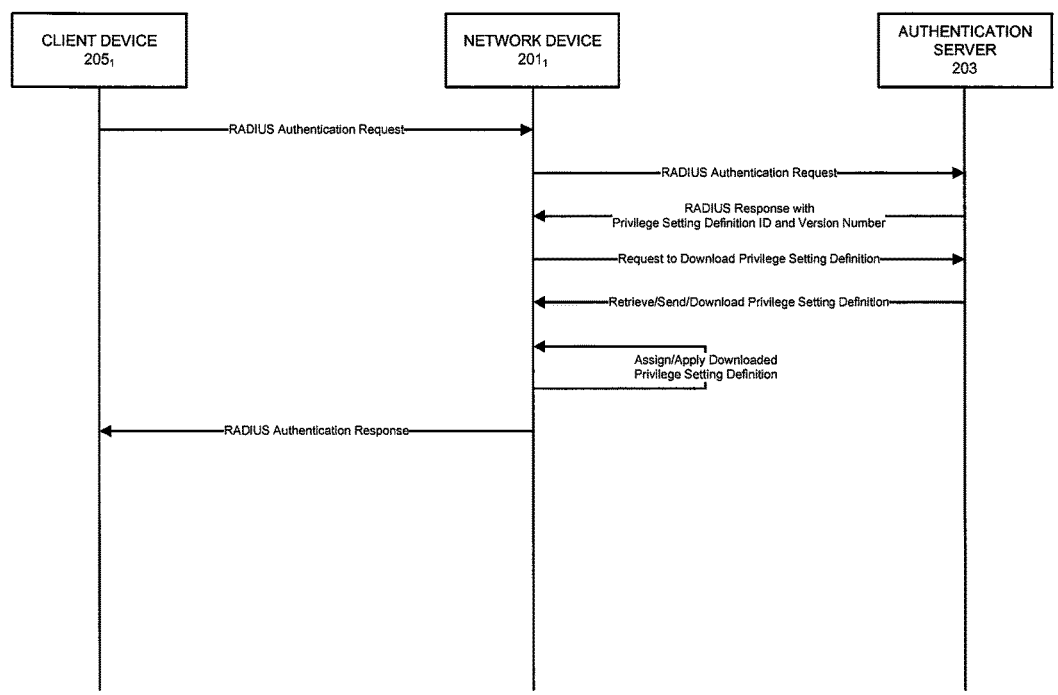
FIG. 3B shows a sequence diagram for applying a privilege setting definition according to another embodiment.

Conversely, upon determining that the correct version of the privilege setting definition assigned to the client device $205_1$ is not locally stored, the network device $201_1$ may transmit a privilege setting definition request to the authentication server 203 at operation 121 as shown in FIG. 3B. The privilege setting definition request may include data identifying a privilege setting definition assigned to the client device $205_1$, including a version number for the definition. In particular, the contents of the privilege setting definition request may be identical to the information contained within the authentication success message transmitted by the authentication server 203 to the network device $201_1$ at operation 113.

In response to the privilege setting definition request, the authentication server 203 may transmit the privilege setting definition identified in the privilege setting definition request to the network device $201_1$ at operation 123. This transmission includes parameter values, permissions, and/or settings that comprises the privilege setting definition assigned to the client device $205_1$. For example, transmission of the privilege setting definition 001 in Table 2 above would include a VLAN value of "4", a QoS value of "qos-profile q1", and a VoIP value of "interface-profile voip-profile v1". In one embodiment, the transmission of the privilege setting definition from the authentication server 203 to the network device $201_1$ may be performed using the secure hypertext transfer protocol (HTTPS). In other embodiments, different transfer protocols may be used at operation 121.

At operation 125 the privilege setting definition may be received and stored on the network device $201_1$ for use with the client device $205_1$ and any other subsequent client device 205 that is assigned this privilege setting definition by the authentication server 203. The method 100 may thereafter move to operation 117 to apply the definition and forward an authentication success message to the client device $205_1$ at operation 119. As noted above, the privilege setting definition describes parameter values, permissions, and/or settings for client device $205_1$ in the network system 200. After the privilege setting definition has been applied and the authentication success message has been forwarded to the client device $205_1$, the client device $205_1$ may begin operating normally within the network system 200.

As described above, the method 100 allows the intelligent retrieval of privilege setting definitions for use by the network device $201_1$. In particular, privilege setting definitions are not uniformly distributed to each network device 201 in the network system 200. Instead, the network devices 201 determine which privilege setting definitions are assigned to client devices 205 currently connected/associated with the network device 201 and retrieves only those privilege setting definitions. Accordingly, the network devices 201 may eliminate the need to store each privilege setting definition that may be assigned by the authentication server 203 and thereby reduce storage and processing requirements.

Figure 4:
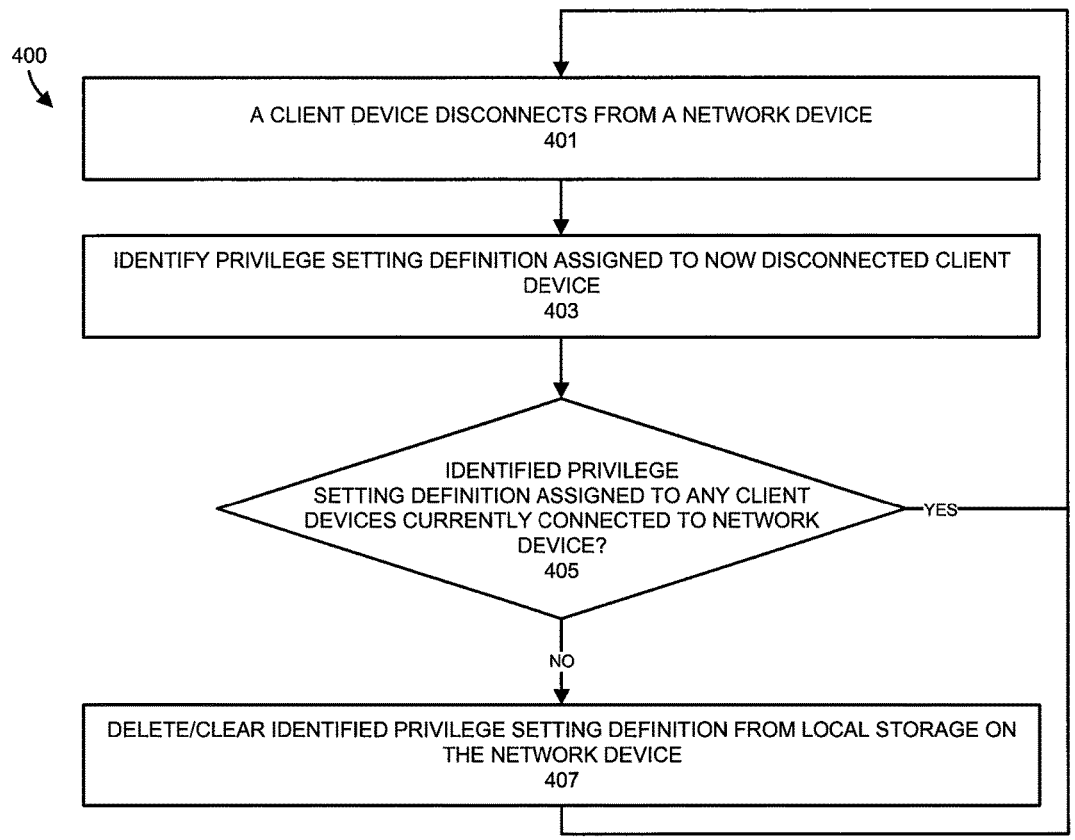
FIG. 4 a method for managing privilege setting definitions in a network system according to another embodiment will be described.

Turning now to FIG. 4, a method 400 for managing privilege setting definitions in a network system according to another embodiment will be described. The method 400 will be described in relation to the network system 200 shown in FIG. 2. In one embodiment, the method 400 causes one or more network devices 201 in the network system 200 to dynamically clear privilege setting definitions from local storage that are no longer in use by a client device 205 connected to the network device 201.

Each operation of the method 400 will be described by way of example below. Although shown and described in a particular order, the operations of the method 400 may be performed in a different order. For example, in some embodiments, two or more operations in the method 400 may be performed in at least partially overlapping time periods. Further, although described and shown separate from the method 400, in some embodiments, the method 400 may be performed together or concurrently with the method 100.

The method 400 will be described in relation to the client device $205_1$ and the network device $201_1$. However, it is understood that the method 400 could be similarly performed for one or more of the client devices $205_2$-$205_P$ and the network devices $201_2$-$201_M$.

In one embodiment, the method 400 may commence at operation 401 with detection that the client device $205_1$ has disconnected/disassociated from the network device $201_1$. This disconnection/disassociation may be caused by a wire connecting the client device $205_1$ and the network device $201_1$ being detached from one of the devices $205_1$ and $201_1$, when a session associated with the client device $205_1$ times out, the client device $205_1$ logs out of a session, or a wireless connection between the devices $205_1$ and $201_1$ being closed. The network device $201_1$ may detect the disconnection/disassociation at operation 401 by the failure to receive data from or otherwise communicate with the client device $205_1$.

Figure 2:
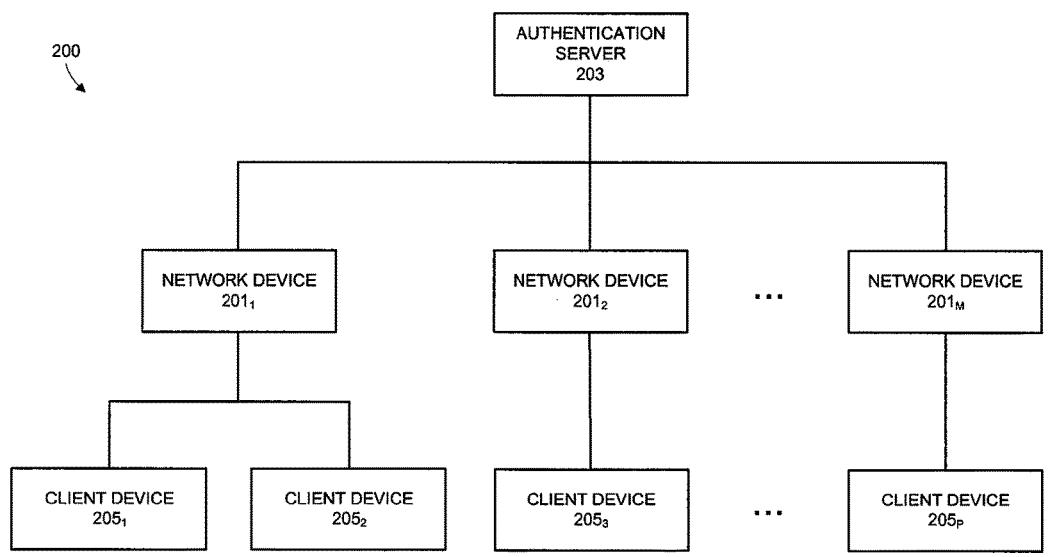
FIG. 2 shows a network system, including a set of network devices, a set of client devices, and an authentication server according to one embodiment.

At operation 403, the network device $201_1$ may determine what privilege setting definition is associated with the now disconnected client device $205_1$. For example, version 2.0 of the privilege setting definition 001, shown in Table 2 above, may have been applied to the client device $205_1$ when the client device $205_1$ was originally connected to the network device $201_1$. The association between client devices 205 and privilege setting definitions may be stored in a data structure on the network device $201_1$ and/or on the authentication server 203. For instance, the network device $201_1$ may store a data structure that maps privilege setting definitions assigned to each of the client devices 205 that the network device $201_1$ is currently connected/associated (e.g., client devices $205_1$ and $205_2$ as shown in FIG. 2).

At operation 405, the network device $201_1$ may determine whether the privilege setting definition associated with the now disconnected client device $205_1$ is associated with any client devices 205 currently connected to the network device $201_1$. For example, the privilege setting definition 001 may also have been associated with and applied to the client device $205_2$, which is also connected to the network device $201_1$ as shown in FIG. 2. If the privilege setting definition associated with the now disconnected client device $205_1$ is still in use by at least one other client device 205 connected to the network device $201_1$, the method 400 returns to operation 401 to await the detection of another client device 205 disconnecting from the network device $201_1$.

When operation 405 determines that no other client device 205 currently connected to the network device $201_1$ is associated with the privilege setting definition corresponding to the now disconnected client device $205_1$, operation 407 may delete/clear this privilege setting definition from local memory of the network device $201_1$. Using the method 400 described above, the network device $201_1$ may again retrieve/download this privilege setting definition if it is ever needed by the network device $201_1$ for a newly connected client device 205. By allowing the network device $201_1$ to delete/clear unused privilege setting definitions based on changing needs, the method 400 allows the network device $201_1$ to reduce the amount of memory space devoted to unused privilege setting definitions and maximize the amount of free space available to the network device $201_1$ for other operations/uses.

Figure 5:
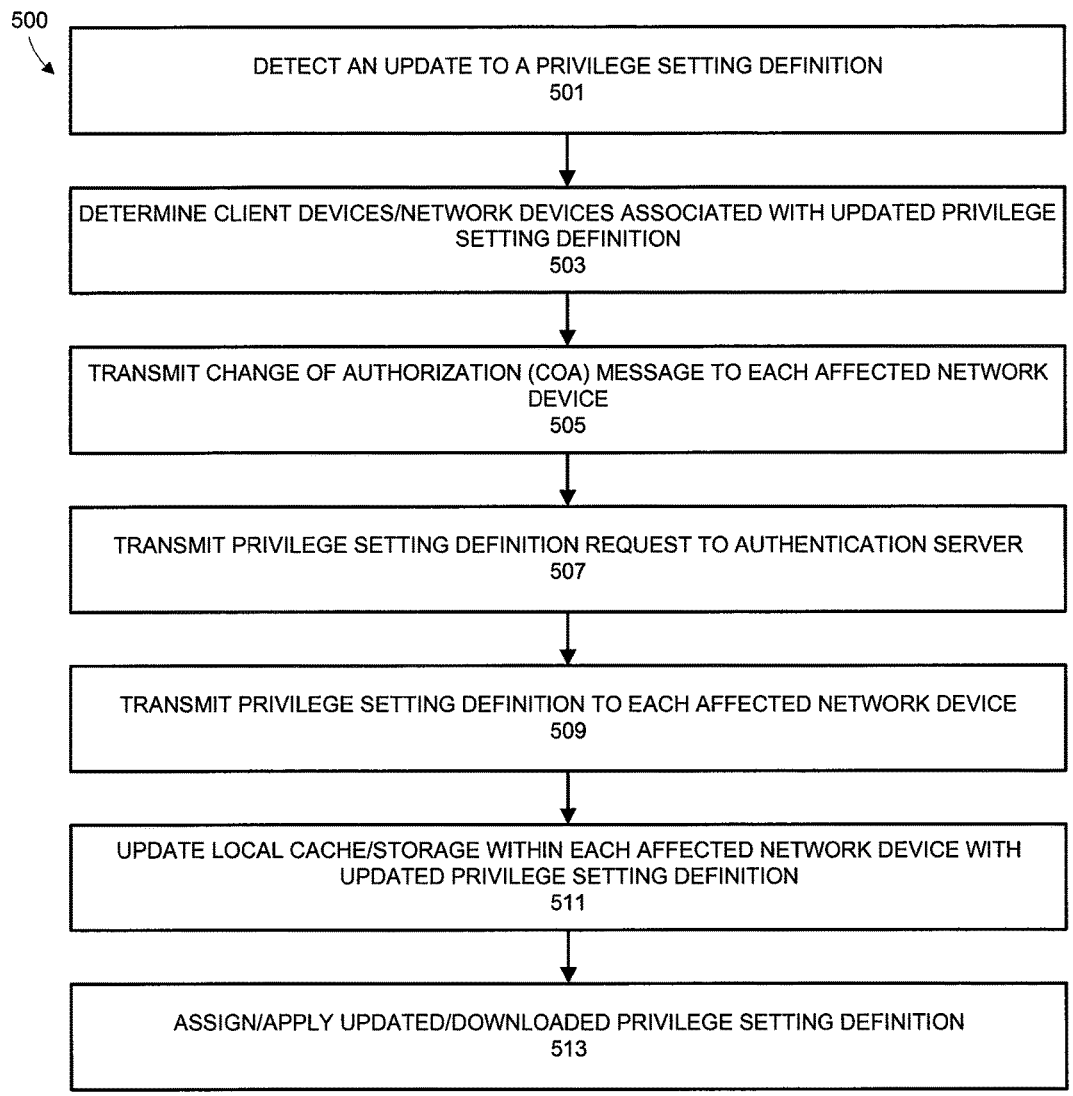
FIG. 5 shows a method for managing privilege setting definitions in a network system according to still another embodiment.

Turning now to FIG. 5, a method 500 for managing privilege setting definitions in a network system according to still another embodiment will be described. The method 500 will be described in relation to the network system 200 shown in FIG. 2. In one embodiment, the method 500 updates privilege setting definitions in use by one or more network devices 201 in the network system 200. The method 500 may be exemplified by the sequence diagram 600 shown in FIG. 6.

Each operation of the method 500 will be described by way of example below. Although shown and described in a particular order, the operations of the method 500 may be performed in a different order. For example, in some embodiments, two or more operations in the method 500 may be performed in at least partially overlapping time periods. Further, although described and shown separate from the method 100 and the method 400, in some embodiments, the method 500 may be performed together or concurrently with the method 100 and/or the method 400.

The method 500 may commence at operation 501 with the detection of the update of a privilege setting definition. In one embodiment, the privilege setting definition may be updated by an administrator of the network system 200. For example, an administrator may update VLAN information for the privilege setting definition 001 shown in Table 1. This change is reflected in Table 2, which is also shown above and includes a change to a version number associated with the privilege setting definition 001. In particular, the version of privilege setting definition 001 changes from 1.0 to 2.0 based on a VLAN modification. Since the privilege setting definition 001 has changed, the network system 200 needs to update the affected network devices 201 such that the network devices 201 may apply these changes to appropriate client devices 205.

The authentication server 203 may provide a graphical user interface for allowing an administrator of the network system 200 to update, add, and/or check the parameters/values/identifiers/version number for privilege setting definitions. In one embodiment, this graphical user interface may be a web interface.

Following detection of an update to a privilege setting definition, the authentication server 203 may determine which network devices 205 utilize a previous version of the recently updated privilege setting definition at operation 503. In one embodiment, the authentication server 203 may store a list of client devices 205 in the network system 200, network devices 201 associated with each corresponding client device 205, and the privilege setting definition used by each device 205.

The list/data structure of privilege setting definitions may be maintained by the authentication server 203 based on (1)

authentication requests processed by the authentication server 203 (as described in method 100) and (2) communications with each network device 201 to identify client devices 205 that have left the network system 200. In some embodiments, this list/data structure may be generated using RADIUS Accounting or any other similar services or protocols.

After examining the list/data structure of privilege setting definitions to identify network devices 201 that are connected to or associated with client devices 205 that are assigned a previous version of the updated privilege setting definition, the authentication server 203 may transmit a RADIUS change of authorization (CoA) message to each of these network devices 201 at operation 505. The CoA message is an update message that may include various pieces of data. In one embodiment, the CoA message identifies the updated privilege setting definitions, including a version number for the updated privilege setting definition. For example, the CoA message may identify version 2.0 of privilege setting definition 001 as having been newly generated.

Figure 6:
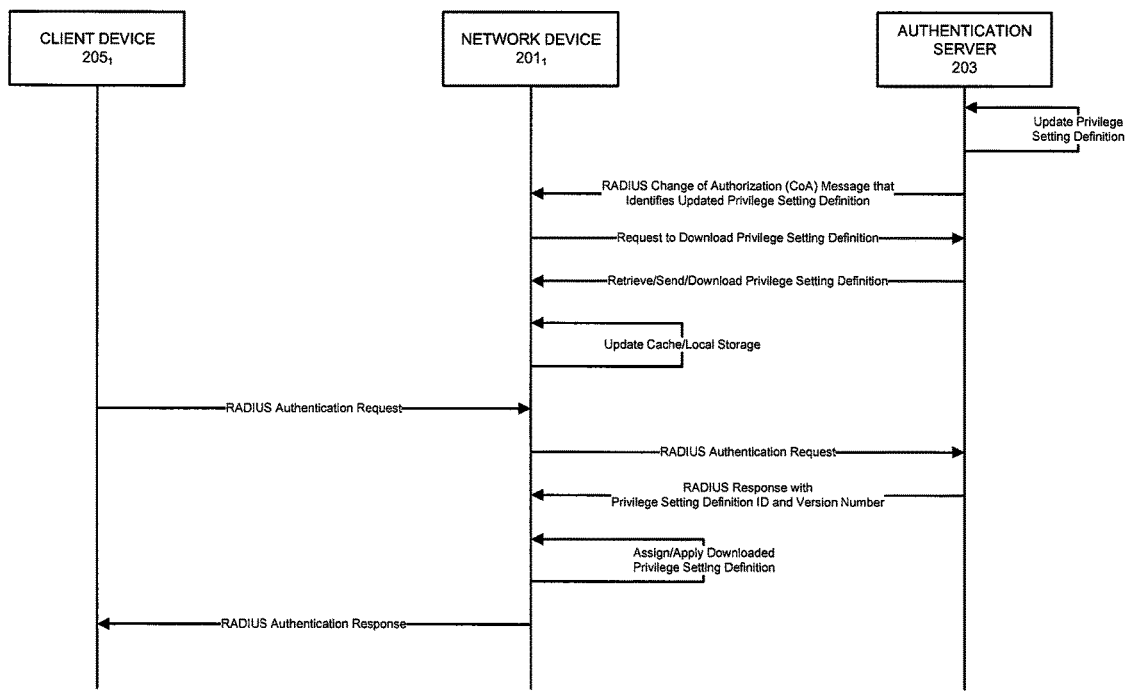
FIG. 6 shows a method for updating privilege setting definitions in a network system according to one embodiment.

Upon receipt of the CoA message, the receiving network devices 201 may be triggered to download the updated privilege setting definition identified in the CoA message from the authentication server 203 at operation 507. In particular, the network devices 201 that received the CoA message may transmit a privilege setting definition request to the authentication server 203 at operation 507 as shown in FIG. 6. The privilege setting definition request may include data identifying the privilege setting definition to be retrieved from the authentication server 203, including a version number for an identified privilege setting definition. In particular, the contents of the privilege setting definition request may be identical to the information contained within the CoA message transmitted by the authentication server 203 to network devices 201 at operation 505.

In response to the privilege setting definition request(s) received from one or more network devices 201, the authentication server 203 may transmit the privilege setting definition identified in the privilege setting definition request(s) to corresponding network devices 201 at operation 509. This transmission includes parameter values, permissions, and/or settings that comprise the privilege setting definition requested by the network devices 201. For example, transmission of the privilege setting definition 001 in Table 2 above would include a VLAN value of "4", a QoS value of "qos-profile q1", and a VoIP value of "interface-profile voip-profile v1". In one embodiment, the transmission of the privilege setting definition from the authentication server 203 to the network devices 201 may be performed using the secure hypertext transfer protocol (HTTPS). In other embodiments, different transfer protocols may be used at operation 509.

At operation 511, the updated privilege setting definition may be received and stored on the network devices 201 that requested this updated definition for use with corresponding client devices 205 that are assigned this privilege setting definition. In one embodiment, the updated privilege setting definition may replace a previous version of the definition in the local storage/cache. For example, the network device $201_1$ may have previously used version 1.0 of privilege setting definition 001. Upon receipt of version 2.0 of privilege setting definition 001, the network device $201_1$ may replace version 1.0 with version 2.0. The method 500 may thereafter move to operation 513 to apply the updated definition to applicable client devices 205. In one embodiment, the application of the privilege setting definition may be performed in response to an authentication request from affected client devices 205 and corresponding responses from the network devices 201 as described above in relation to FIG. 3A as shown in FIG. 6. In other embodiments, the network devices 201 may automatically apply the updated privilege setting definition to affected client devices 205 without an authentication request from the client devices 205. By intelligently distributing updated privilege setting definitions to network devices 201 based on a corresponding need (i.e., client devices 205 that are assigned a previous version of the privilege setting definition), the method 500 ensures that affected network devices 201 and client devices 205 are updated while limiting the impact on other network devices 201 and general network system 200 resources.

Returning to FIG. 2, each component of the network system 200 will be described. Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") can be hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 7:
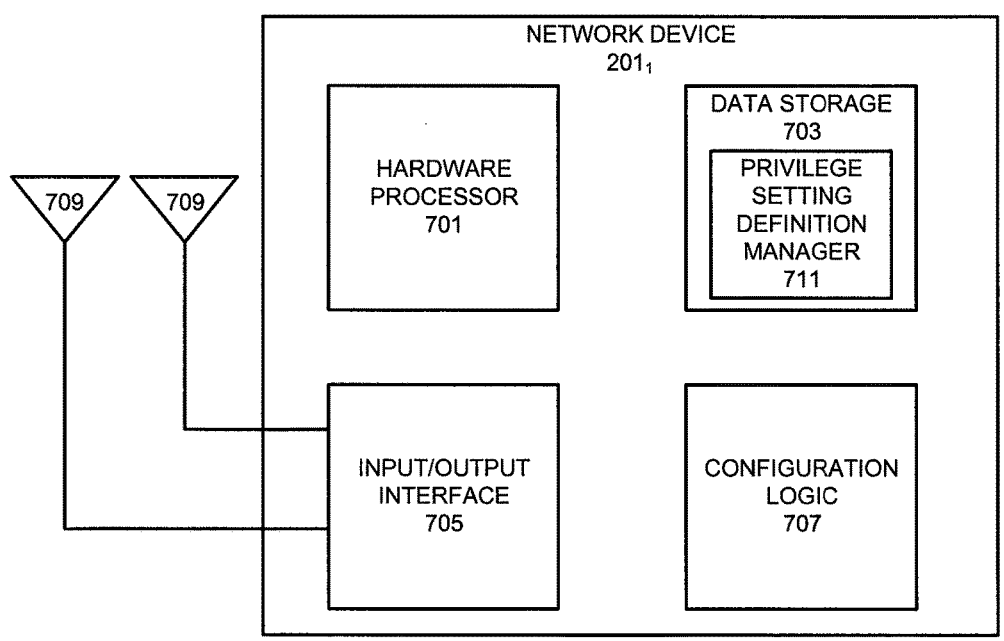
FIG. 7 shows a component diagram of a network device according to one embodiment.

FIG. 7 shows a component diagram of the network device $201_1$ according to one embodiment. The network device $201_1$ may be any digital device that is capable of managing privilege setting definitions as described above in relation to the methods 100, 400, and/or 500. As shown, the network device $201_1$ comprises one or more of: a hardware processor 701, data storage 703, an input/output (I/O) interface 705, and device configuration logic 707. Each of these components of the network device $201_1$ will be described in further detail below.

The data storage 703 of the network device $201_1$ may include a fast read-write memory for storing programs and data during operations and a hierarchy of persistent memory, such as Read Only Memory (ROM), Erasable Programmable Read Only Memory (EPROM,) and/or Flash memory for example, for storing instructions and data needed for the startup and/or operation of the network device $201_1$. For example, as shown in FIG. 7, the data storage 703 may include the privilege setting definition manager 711 that may be executed by the hardware processor 701. The privilege setting definition manager 711 may manage privilege setting definitions for one or more client devices 205 coupled to the network device $201_1$ according to the methods 100, 400, and 500 described above. In one embodiment, the data storage 703 is a distributed set of data storage components.

In one embodiment, the I/O interface 705 corresponds to one or more components used for communicating with other devices (e.g., the client devices $205_1$-$205_P$, the network devices $201_2$-$201_M$, and/or the authentication server 203) via wired or wireless signals. The I/O interface 705 may include a wired network interface such as an IEEE 802.3 Ethernet interface and/or a wireless interface such as an IEEE 802.11 WiFi interface and corresponding antennas 709. The I/O interface 705 may facilitate communications with the client devices $205_1$-$205_P$, the network devices $201_2$-$201_M$, the authentication server 203, and/or other devices in the system 200 over corresponding wired or wireless connections.

In one embodiment, the hardware processor 701 is coupled to the data storage 703 and the I/O interface 705. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 707 includes one or more functional units implemented using firmware, hardware, software, or a combination thereof. In some embodiments, the configuration logic 707 may be used for configuring parameters of the network device $201_1$. For example, the device configuration logic 707 may manage privilege setting definitions for one or more client devices 205 coupled to the network device $201_1$ according to the methods 100, 400, and 500 described above in conjunction or apart from the privilege setting definitions manager 711.

Although the network device $201_1$ is described above, in some embodiments, the network devices $201_2$-$201_M$ may be similarly configured and designed. In particular, the network devices $201_2$-$201_M$ may comprise one or more of: a hardware processor 701, data storage 703, an input/output (I/O) interface 705, and device configuration logic 707 such that the network devices $201_2$-$201_M$ may manage privilege setting definitions for associated client devices 205 as described above in the methods 100, 400, and 500 in relation to the network device $201_1$.

In one embodiment, the client devices $205_1$-$205_P$ and the authentication server 203 may be any wired or wireless digital device capable of receiving and transmitting data over wired or wireless mediums. Similar to the network devices $201_1$-$201_M$, the client devices $205_1$-$205_P$ may comprise one or more of: a hardware processor 701, data storage 703, an input/output (I/O) interface 705, and device configuration logic 707 such that the client devices $205_1$-$205_P$ and the authentication server 203 may operate according to the methods 100, 400, and 500 described above.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages is applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for managing privilege setting definitions on a network device operating in a network system, comprising:

receiving, by the network device, an authentication success message from an authentication server, wherein the authentication success message identifies a first privilege setting definition for a first client device connected to the network device;

determining, by the network device, whether the identified first privilege setting definition is stored in a memory unit within the network device, wherein in response to determining that the first privilege setting definition is not located within the memory unit of the network device;

requesting, by the network device, the first privilege setting definition from the authentication server in a privilege setting definition request;

determining, by the network device, that a second client device has disconnected from the network system;

identifying, by the network device, a second privilege setting definition assigned to the disconnected second device;

determining, by the network device, if the second privilege setting definition is assigned to a different client device; and removing, by the network device, the second privilege setting definition from a local storage memory on the network device when, the network device determines that the second privilege setting definition is not assigned to the connected client device.

2. The method of claim 1, further comprising:
receiving, by the network device, the requested first privilege setting definition from the authentication server, wherein the first privilege setting definition includes a set of parameter values for controlling communications of the first client device in the network system; and
applying, by the network device, the set of parameter values to communications of the first client device.

3. The method of claim 2, wherein the set of parameter values includes one or more of an access control list (ACL), virtual local area network (VLAN) information, a voice over Internet Protocol (VoIP) setting, a firewall rule, and a quality of service (QoS) setting.

4. The method of claim 2, further comprising:
forwarding the authentication success message from the network device to the first client device.

5. The method of claim 1, further comprising:
in response to determining that the first privilege setting definition is located within the memory unit of the network device, applying, by the network device, a set of parameter values included in the first privilege setting definition to communications of the first client device.

6. The method of claim 1, wherein the identification of the first privilege setting definition in the authentication success message includes an identifier and a version number for the first privilege setting definition.

7. The method of claim 1, further comprising:
forwarding, by the network device, an authentication request message from the first client device to the authentication server, wherein the authentication success message is generated and transmitted to the network device in response to the authentication request message.

8. A non-transitory computer readable medium comprising instructions which, when executed by one or more hardware processors of a network device operating in a network system, cause the network device to:
process an authentication success message received from an authentication server, wherein the authentication success message identifies a first privilege setting definition for a first client device connected to the network device;
determine whether the identified first privilege setting definition is stored in a memory unit within the network device, wherein in response to determining that the first privilege setting definition is not located within the memory unit of the network device;
request the first privilege setting definition from the authentication server in a privilege setting definition request;
determine, by the network device, that a second client device has disconnected from the network system;
identify, by the network device, a second privilege setting definition assigned to the disconnected second device;
determine, by the network device, if the second privilege setting definition is assigned to a different client device; and
removing, by the network device, the second privilege setting definition from a local storage memory on the network device when the network device determines that the second privilege setting definition is not assigned to the connected client device.

9. The non-transitory computer readable medium of claim 8, comprising further instructions which, when executed by the one or more hardware processors of the network device operating in a network system, cause the network device to:
process the requested first privilege setting definition received from the authentication server in response to the first privilege setting definition request, wherein the first privilege setting definition includes a set of parameter values for controlling communications of the first client device in the network system; and
apply the set of parameter values to communications of the first client device.

10. The non-transitory computer readable medium of claim 9, wherein the set of parameter values includes one or more of an access control list (ACL), virtual local area network (VLAN) information, a voice over Internet Protocol (VoIP) setting, a firewall rule, and a quality of service (QoS) setting.

11. The non-transitory computer readable medium of claim 9, comprising further instructions which, when executed by the one or more hardware processors of the network device operating in a network system, cause the network device to:
forward the authentication success message from the network device to the first client device.

12. The non-transitory computer readable medium of claim 8, wherein the identification of the first privilege setting definition in the authentication success message includes an identifier and a version number for the first privilege setting definition.

* * * * *